April 8, 1947.  E. A. ROCKWELL  2,418,667

PACKAGED POWER ACCUMULATOR

Filed April 7, 1944  2 Sheets-Sheet 1

Inventor:
Edward A. Rockwell

April 8, 1947.  E. A. ROCKWELL  2,418,667
PACKAGED POWER ACCUMULATOR
Filed April 7, 1944  2 Sheets-Sheet 2

Inventor:
Edward A. Rockwell

Patented Apr. 8, 1947

2,418,667

UNITED STATES PATENT OFFICE 2,418,667

PACKAGED POWER ACCUMULATOR

Edward A. Rockwell, Cleveland, Ohio, assignor, by mesne assignments, to Borg-Warner Corporation, Chicago, Ill., a corporation of Illinois Application April 7, 1944, Serial No. 530,079

19 Claims. (Cl. 103—25)

The present invention relates to hydraulic power unit arrangements generally and particularly to a unitary or package hydraulic power generating and accumulating assembly.

It is an object of this invention to provide a unitary assembly functioning to generate and maintain hydraulic fluid pressure between selected maximum and minimum levels of pressure and wherein the accumulator, the generator and the other necessary equipment are all nested together in a compact efficient manner and are embraceably supported by one housing so that the unit may be readily located and mounted in the most advantageous position.

It is an object to provide an improved accumulator arrangement which lends itself particularly to incorporation in a single package assembly.

It is an important object of this invention to provide a pressure accumulator and low pressure reservoir which may be connected up to a system for pressure utilization of hydraulic fluid, such as a brake system wherein the system is adapted to operate as a closed system with all the air excluded from the system. Also, a more particular object is to provide improved means for effectively bleeding the system, wherein a pressure bleeder can be used to force fluid through the lines to exclude air.

A further important object of the invention is to combine a spring accumulator with an air-charged accumulator so in case of failure of the air pressure or puncturing of the flexible diaphragm in the air-charged accumulator, the spring accumulator will take over and maintain the system in operation, this being important on brakes so as to increase the safety for brake operation.

Another object is the provision of a unit of the said type incorporating in an improved and novel manner a first primary compact accumulator and a second relatively smaller capacity secondary accumulator of the plunger type particularly effective for operating the electrical control switch for stopping and starting the driving electric motor in accordance with the level of pressure within the unit.

An additional object is the provision of a special snap action switch and operating connection for actuation by the secondary accumulator.

Still another object is the provision of an atmospheric pressure control accumulator arrangement effective to maintain atmospheric pressure within the fluid in the low pressure intake portion of the accumulator.

A still further detailed object is the formation of the supporting and enclosing housing in a cylindrical shape for the ready reception of piston-like partitions effective to properly divide up the interior of the housing as well as to support the several elements of equipment.

The above and other objects, advantages and uses of my invention will become apparent from a reading of the following specification taken in connection with the accompanying drawings which form a part thereof and wherein.

Figure 1:
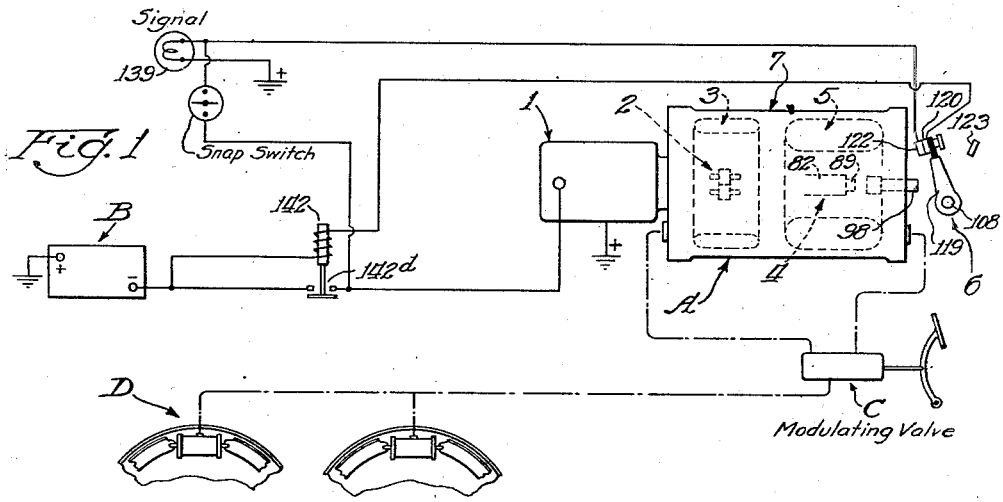
Fig. 1 is a schematic layout view indicating one system arrangement of which my invention is particularly adapted to form a part.
Figure 3:
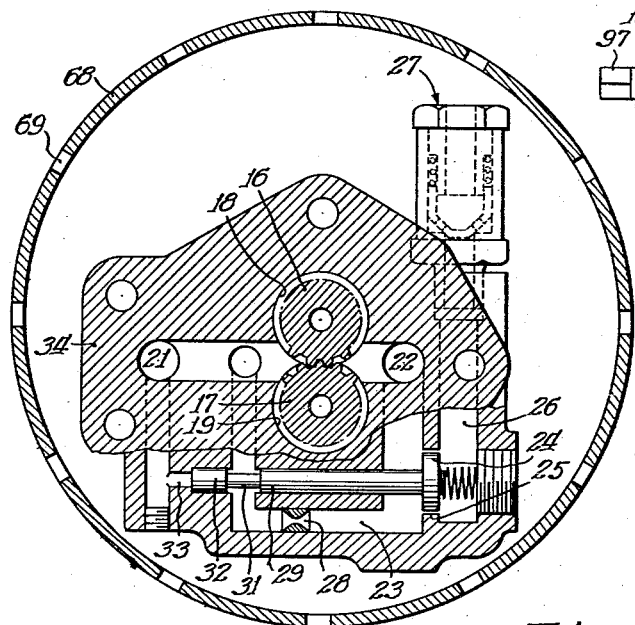
Fig. 3 is a transverse cross-sectional view taken substantially on the line 3—3 of Fig. 2.
Figure 4:
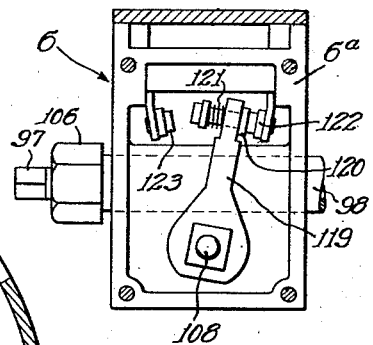
Fig. 4 is an elevational view showing the rear portion of the switch mechanism disclosed in the right-hand portion of Fig. 2.
Figure 2:
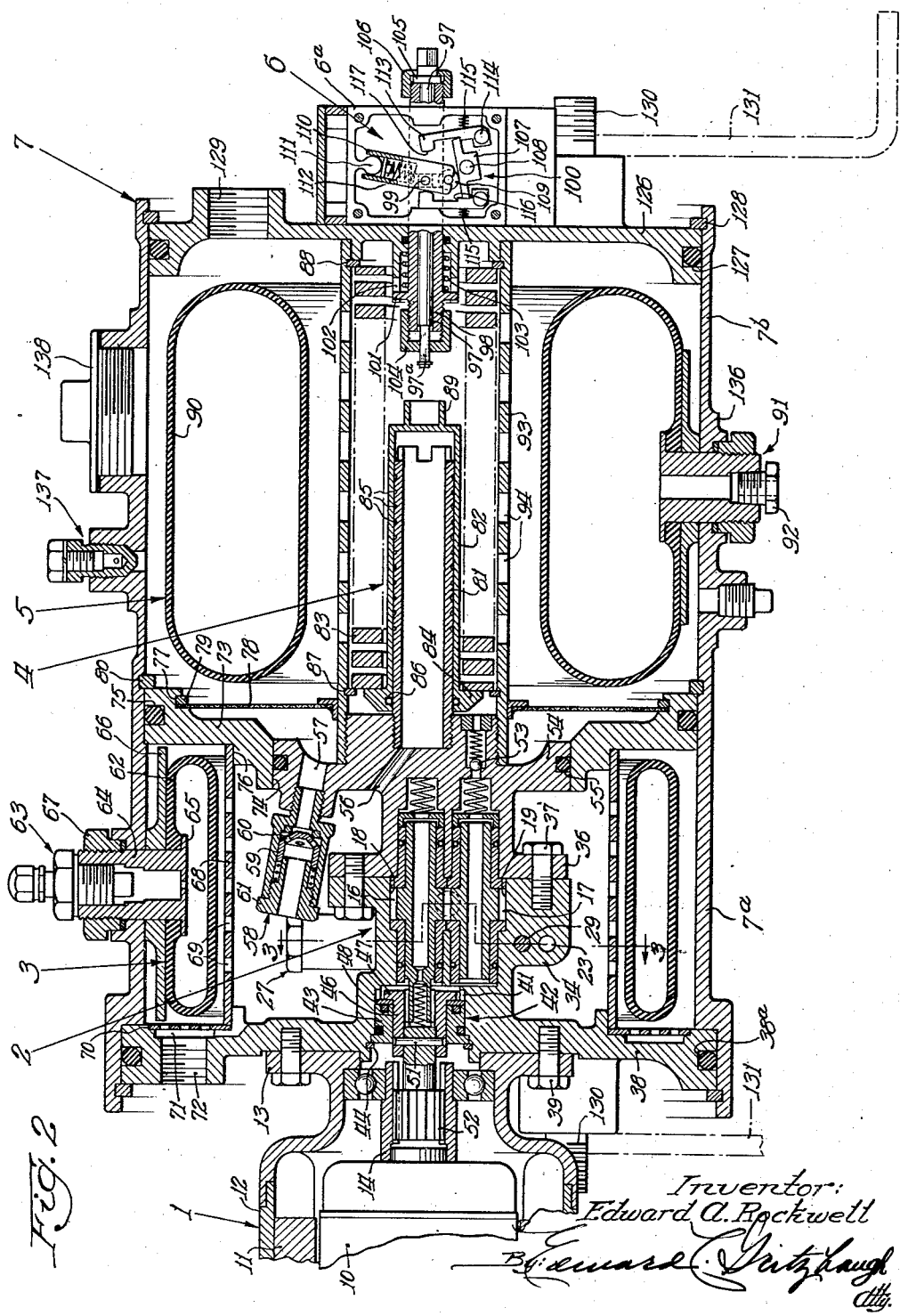
Fig. 2 is an axial sectional view of my special arrangement of unitary or packaged hydraulic power generating and accumulating assembly.

Referring in greater detail to the figures of the drawings and first to Fig. 1, there is illustrated schematically a typical system arrangement of which my invention is particularly adapted to form a component part. Essentially my special arrangement of unitary or packaged hydraulic power generating and accumulating assembly indicated generally at A functions to maintain a pressure level between selected maximum and minimum values. As will appear from the detailed description, this unit A includes an electric driving motor fed by a supply of electrical current and control therefor designated generally at B. Electrical supply and control B is effective to automatically start and stop the electric motor driven pressure fluid generator in accordance with the rise and fall of pressure within the accumulator unit A. As an illustration of one use for the hydraulic pressure supply maintained in the accumulator A, there is illustrated a manually controlled modulating valve assembly C effective to withdraw hydraulic pressure from the accumulator A thus changing the level thereof, which pressure fluid is delivered to a brake shoe operating motor indicated generally at D.

In the more particular aspects of my invention, the same is directed to the construction, the arrangement, and to the mode of coaction of the component parts making up accumulator unit A. Accumulator A comprises generally an electric motor 1 driving a hydraulic fluid pressure generator 2, compactly and embraceably received within toroidal or donut-shaped primary air accumulator 3 and axially spaced from smaller capacity secondary switch-actuating hydraulic accumulator 4 in turn compactly and embraceably received within a second toroidal or donut-shaped atmospheric pressure accumulator 5, and electric motor control snap action switch assembly 6 carried in axial alignment with secondary accumulator 4 for actuation thereby, all of the above elements being supportably carried by a unifying housing assembly 7 including a high pressure cylindrical housing portion 7a and a low pressure cylindrical housing portion 7b.

Electric motor 1 is of a readily available form including armature 10 rotatable within field winding 11 supported by motor housing 12 which terminates in radial flange 13. The driving end of motor armature 10 has a coupling assembly 14 rotatably supported in an anti-friction bearing.

Pressure fluid generator 2 comprises a pair of meshing gears 16 and 17 rotatably received within a pair of overlapping cylindrical chambers 18 and 19, these gears meshing in the area of overlapping of the chambers. Low pressure fluid from the low pressure end of the accumulator is introduced or drawn into the generator proper through passage 21 carried around the periphery of the gears and discharged through passage 22. Passage 23 permits the recirculation of liquid at low pressure from discharge passage 22 back around to inlet passage 21 during the initial starting of the electric motor 1 thus eliminating starting the motor under load. The initial delivery of fluid by the gears to passages 22 and 23 places the same in contact with piston-like valve 24 receivable in a complementary shaped cylinder-like port 25 communicating with outlet passage 26 leading to check valve 27 discharging into the surrounding accumulator 3. A small tolerance is allowed between piston-like valve 24 and port 25 to cause a limited flow therebetween in the direction of outlet passage 26 with the result that piston-like valve 24 begins to move freely in response to the generated pressure acting thereon, this action being insured by Venturi-like restriction 28 in passage 23 causing the pressure to build up as the electric motor 10 gains speed. The operation of piston-like valve 24 raises cylindrical stem 29 shifting reduced stem portion 31 transversely of the lower leg portion of passage 23 and moving piston-like portion 32 across the passage 23 shutting off the flow therethrough and loading the gears to produce full output through passage 26 and check valve 27. The under side of piston 32 is placed in communication with low pressure inlet 21 through passage 33.

It will thus appear that upon the electric motor 10 first being started the same operates under appreciably no load since the fluid pressure generator 2 is merely recirculating the output fluid back around through bypass passage 23 to the inlet of the generator.

The generator housing proper is preferably formed in two transversely divided parts 34 and 36 held together by cap screws 37. The outer section 34 is shown as including an integral one-piece radial flange 38 adapted to function as one end closure for the accumulator 3, and also support radial flange 13 of the electric motor housing, flange 13 being fastened to flange or closure member 38 by means of cap screws 39. Flange or closure member 38 is formed with a generally axial orifice 41 in alignment with upper gear 16 of generator 2 and arranged to support a coupling assembly 42 for drivingly coupling electric motor 10 and upper gear 16. Closure flange 38 is formed about its periphery with an annular channel 38a for reception of a flexible seal ring functioning to provide a seal with housing portion 7a. Snap ring 38b is partially received in a complementary annular recess in housing portion 7a and functions to retain closure flange 38 in place. This coupling assembly 42 comprises essentially a bushing insert 43 confined in position by a snap ring 44 and provided with flexible sealing rings as indicated. A rotatable bushing 46 has a radial flange 47 engaging a bearing washer 48 in turn compressing a flexible seal ring as indicated. Rotatable bushing 46 is internally splined for cooperation with a complementary splined terminal portion of upper gear 16 and receives in the outer terminal, the non-circular end of a second splined gear 52 being fastened thereto by means of a diametrically extending pin 51. Splined gear 52 is received within complementarily splined motor coupling assembly 14. Ball check valve 53 places the axial passages through the gears and the sealed coupling assembly in communication with the low pressure portion of the accumulator with but a slight or few pounds of drop in pressure across the ball check valve 53. The right-half 36 of the generator housing proper includes a radial flange portion 54 formed in the periphery thereof with a recessed annular channel 55 for the reception of a sealing ring to provide a seal with the accumulator partition as will appear. A passage 56 places the accumulator 3 in communication with the auxiliary hydraulic accumulator 4.

Still another passage 57 through flange 54 is threaded to receive and support check valve 58 serving the very important function of facilitating the air bleeding of the generator and accumulator unit. Check valve 58 and outlet check valve 27 are of similar construction and hence only valve 58 will be described in its essential details. Air bleed check valve 58 comprises essentially a threaded base portion for reception within the threaded terminal of passage 57, an outwardly extending tubular body portion receiving a valve proper 59 perforated at 60 to allow the passage of fluid therepast when open, this valve 59 being normally urged toward closed position by compression springs confined within the valve body by a threaded closure 61.

Toroidal or donut-shaped primary accumulator 3 comprises generally a toroidal shaped flexible tube 62 arranged to be inflated by air under pressure which may be introduced through valve assembly 63. By virtue of this toroidal or automobile inner-tube-like shape, this flexible tube is arranged to embraceably enclose the central space containing the fluid under pressure as well as embrace pressure generator 2. This results in a compact and efficient use of the space involved. A tubular valve stem 64 passes through the wall of the housing and presents a radial flange 65 within flexible tube 62 for clamping the tube against a flange insert member 66 and the housing wall by means of nut 67 all very much in a manner similar to that in which an automobile inner tube is arranged. The difference resides principally in that the flexible tube 62 is generally flat in cross-section having a pair of opposed walls extending generally parallel to the major axis, as well as having the air inlet valve member extending radially outwardly through the housing instead of radially inwardly as in the case of an automobile inner tube. A radially inwardly spaced circular cage 68 is formed with a plurality of radial perforations 69, this cage functioning to admit pressure fluid into contact with the flexible tube 62 but limiting the extent of radial inward movement of the tube. Additional cage 70 is located between the side of tube 62 adjacent the motor, covering recessed channel 71 extending around the periphery of closure flange 38 and functioning to prevent flexible tube 62 from engaging the inner surface of closure flange 38 which would otherwise shut off the exit of high pressure fluid from discharge port 72.

On the opposite side of flexible tube 62 from outlet port 72 there is located a partition ring 73 having an inner circular opening 74 complementary in size to pump flange 54, a sealing ring is carried within annular groove 55 of the pump flange serving to provide a seal. Partition ring 73 has a circular outer periphery formed with an annular groove 75 for the reception of a flexible sealing ring cooperating with the inner periphery of tubular housing wall 7b to provide a seal therebetween. Shoulder 76 on the partition ring 73 supports one terminal of cage 68 against radial inward movement. Recessed annular channel 77 receives the outer periphery of a filter screen 78 confined therein by a snap ring 79. Snap ring 80 is received in a similar recessed annular channel in the inner periphery of housing portion 7b and functions to hold partition ring 73 against axial movement when subject to the pressure within primary accumulator 3.

Secondary switch-actuating accumulator 4 comprises a fixed tubular piston 81 threadably attached to pump housing section 36 at one end thereof for communication with primary accumulator 3 through passage 56. Cylinder 82 telescopically embraces piston 81 in sealed relation thereto and is normally urged in telescoping direction by an embracing low rate compression spring 83 acting against radial flange 84. Fixed piston 81 is provided about the periphery thereof with relieving grooves 85 and is given a lapped fit within telescoping cylinder 82. Radial flange 84 is formed with an internal annular channel receiving a flexible sealing ring further providing a seal with fixed piston 81. Snap ring 87 is supported in a manner, as will appear, such that it functions to limit the extent of movement of compression spring 83 while the opposite terminal of this spring is confined by an additional snap ring 88. Cylinder 82 is closed at the outer terminal thereof and is provided with a nipple-like guide extension 89 for cooperation with control switch 6 in a special manner to be described.

It will thus appear that in operation secondary relatively small capacity accumulator 4 receives pressure from primary accumulator 3 through passage 56 causing reciprocable cylinder 82 to move in extended direction against the action of low rate compression spring 83 to an extent determined by the value of the pressure that has been built up by pressure generator 2. By correlating the movement of cylinder 82 with the action of control switch 6, as will appear, a more effective and efficient operation of electric motor 1 and pressure generator 2 is accomplished.

Atmospheric pressure accumulator 5 comprises a second larger toroidal or donut-shaped flexible tube 90 received within housing portion 7b axially spaced from donut tube 62 of primary accumulator 3 on the opposite side of partition wall 73 and spaced radially in embracing relation to secondary switch-actuating accumulator 4. Atmospheric vent assembly 91 functions to admit atmospheric pressure to the interior of flexible tube 90 at all times. This vent assembly 91 is similar in construction to valve assembly 63 of primary accumulator 3 above described, except that a vent valve 92 is employed instead of a connection for the introduction of super-atmospheric pressure as in the case of the former valve assembly. A tubular cage 93 is interposed between flexible tube 90 and secondary accumulator 4 to limit the radial inward movement of tube 90, this tube being preferably supported at one terminal on generator housing section 36 and at the other terminal on the housing closure as will appear. Perforation 94 allows the free flow of low pressure fluid about secondary accumulator 4 and flexible tube 90. It will be noted that atmospheric pressure accumulator tube 90 is considerably larger in cross-section than primary accumulator tube 62 for a reason that will appear.

Atmospheric pressure accumulator tube 90 is always subject to atmospheric pressure on the interior thereof and therefore regardless of variations in the quantity of low pressure liquid contained within contact therewith, this liquid will always be maintained at atmospheric pressure and free from any tendency to have air drawn into the liquid and adversely affect the operation. Tube 90 is necessarily larger in cross-section than primary accumulator tube 62 since it must perform its function in response to atmospheric pressure which is relatively low.

Accumulator-actuated motor control switch assembly 6 comprises adjusting wrench or plunger 97, having a non-circular terminal portion 97a functioning as a wrench to adjust internally threaded closure cap 104, which in turn is engageable by cup 89 of cylinder 82. Sleeve 98 carries transversely extending switch-actuating pin 99 effective to cause the snap operation of switch assembly proper 100 upon movement past the over-center position. Sleeve 98 has radially extending fingers 101 slidably cooperating with guide 102 that may be formed either in the housing end closure or in a separate part attached thereto. Compression spring 103 urges sleeve 98 in the direction of reciprocable cylinder 82 of secondary accumulator 4. Closure cap 104 is orificed for cooperation with adjusting wrench 97 and is internally threaded for attachment to the terminal threaded portion of sleeve 98. This arrangement provides for external adjustment of the cut out pressure as well as the cut in pressure. A radial flange 105 is carried on the outside portion of plunger 97 and is held in engagement with the outside terminal of sleeve 98 by means of a second internally threaded centrally orificed cap 106. It will be seen that this arrangement provides for manual override operation of the switch when desired, merely by manually engaging terminal bonnet 106.

The switch assembly proper 100 includes a snap action mechanism comprising a walking beam 107 drivingly connected to a switch-operating shaft 108 contacted by a roller 109 carried on the end of an over-center swinging arm or yoke 110. This arm or yoke member embraces an arcuate protuberance 111 carried by switch housing 6a, this yoke member being urged away from protuberance 111 by compression spring 112 with the result that the movement of actuating pin 99 by plunger 97 and sleeve 98 past its center position with reference to the axis of supporting shaft 108 is effective to cause a snap action or quick arcuate movement of walking beam 107 and supporting shaft 108. For the purpose of latching walking beam 107 in either position to which the same is moved, there is provided opposite each terminal of the walking beam duplicate latches 113. Each latch is supported on a pivot 114 and is urged in the direction of the walking beam 107 by compression spring 115. Shoulders 116 function to lock the associated terminal of walking beam 107 subject to the subsequent release thereof by inwardly extending finger 117 being contacted by arcuately shiftable arm or yoke 110. Oscillatable shaft 108 also supports in spaced relation to walking beam 107 another arcuately swingable arm 119 supported thereon in driving relation. Arm 119 carries contacts 120 cushioned by compression springs 121 (only one being shown). The arm 119 is swung arcuately to bring contact 120 into engagement with grounded contact 122 carried by housing 6a or into engagement with stop 123.

Supporting and enclosing housing assembly 7 comprises in addition to portion 7a and 7b already described a low pressure chamber closure member 126 having a circular periphery formed with a recessed annular channel 127 for reception of a flexible seal ring providing a seal with the embracing housing portion 7b, this closure member being confined in position by a snap ring 128 fitting in a complementary channel on the inner periphery of the housing 7b. This closure member is formed with an inlet port 129 for the return introduction of low pressure fluid. A stud bolt 130, or as many thereof as is desired, may be threadably mounted in end closure 126 for attachment to a suitable support such, for example, as a bracket 131, a similar supporting arrangement being also provided for the opposite end closure 138. Air bleed assembly 137 serves to bleed air from the low pressure accumulator portion 4. A refill plug assembly 138 provides for readily replenishing hydraulic fluid.

Referring again to Fig. 1 in somewhat greater detail, the driving power supply assembly B comprises a storage battery arranged to deliver electrical current through contacts 142d of relay 142 when closed, to electrical motor 1. Relay 142 is normally energized and deenergized automatically by the operation of control switch 6 in response to the rise and fall of pressure in the accumulator A. Control current passes from the battery through contact 122 of switch 6. In the event that the pressure in the accumulator has dropped to a point permitting cylinder 82 to move in the telescoping direction sufficiently to allow spring 103 to shift plunger 97 and sleeve 98 and thus effect the snap action of walking beam 107 and switch arm 119 to contact ground terminal 122, then relay 142 will be energized to close contacts 142a and deliver current to the electric motor 1 for operating the same to drive fluid pressure generator 2. In addition, signal light 139 will be illuminated to indicate the operating condition of electric motor.

Electric motor 1 will continue to operate until the hydraulic pressure acting on shiftable cylinder 82 rises to a sufficient level to cause the cylinder to again contact plunger 97 and shift the same sufficiently to cause snap action of walking beam 107 and the moving of arm 119 to separate live contact 120 from ground contact 122 thus opening the motor circuit. Lowering of the pressure may again be brought about by operation of manually controlled modulator valve C to deliver pressure fluid to the brake motor assembly D and the consequent operation of switch 6 to start the electric motor 1 and fluid pressure generator 2.

As a stand-by means for manually energizing relay 142 a manual push button controlled circuit may be provided as shown.

From the above, it will be seen that I have provided an improved and important relationship of elements resulting in compactness and efficiency in accumulators generally. For example, primary high pressure toroidal tube 62 may be readily substituted for the present inefficient, cumbersome diaphragm now incorporated in the well-known spherical form of accumulator. The equivalent of tubular surrounding housing portion 7a and associated piston-like end closure members may also be employed and this arrangement may be used either with or without the incorporation of a pressure fluid generator within the housing.

It will appear further that, when the problem is merely one of maintaining atmospheric pressure within a supply of hydraulic fluid, then an arrangement equivalent of that shown in connection with low pressure toroidal tube 90 may be employed for this purpose.

While I have disclosed my invention in connection with certain specific embodiments thereof, it is to be understood that this is by way of example only and that equivalent arrangements are contemplated as coming within my invention which is defined by the appended claims.

I claim:

1. In a hydraulic pressure fluid accumulator, means defining a housing including a generally tubular shaped elongated main body and closure means for the terminals of said tubular body, an endless tube of anchor-ring shape having a closed internal annular surface and a continuous exterior surface, said tube received within said housing with the radial outer periphery thereof adapted to engage the inner circumference of said tubular main body, valve means extending through said tubular wall for introducing super-atmospheric pressure into said tube, means for introducing hydraulic fluid under super-atmospheric pressure into contact with the outer periphery of said toroidal tube within said housing, and a cylindrical perforate wall extending axially through said toroidal tube for limiting radially inward flexing of the tube.

2. In a hydraulic pressure fluid accumulator, means defining a generally elongated housing having a tubular surrounding wall, means defining piston-like end closure members for said tubular wall, means defining a toroidal shaped flexible tube received within said housing adjacent the inner periphery of said tubular wall, valve means extending through said tubular wall of said housing for introducing super-atmospheric pressure into said toroidal tube, means defining a perforated generally circular wall disposed concentrically within said toroidal tube for limiting radially inward flexing of said tube, each of said piston-like closure members being formed with complementary shoulder portions receiving the terminal portions of said perforated wall for support thereon against radial inward movement when subjected to pressure by said tube, and means for introducing hydraulic fluid under super-atmospheric pressure into said housing for contact with the outer surface of said toroidal tube.

3. In a hydraulic fluid accumulator, means defining a housing having a surrounding wall generally circular in transverse cross section, a toroidal shaped flexible tube received within said housing, atmospheric air vent means extending through the wall of said housing for exposing the interior of said tube to atmospheric pressure, means defining an inlet port for the introduction of low pressure return hydraulic fluid into said housing into contact with the exterior surface of said tube, whereby to prevent occlusion of air in the low pressure hydraulic fluid; and a perforate tubular wall arranged concentrically within said toroidal tube for limiting radially inward flexing of said tube.

4. In a hydraulic pressure fluid accumulator, means defining a housing having a surrounding wall generally circular in transverse cross section, an endless toroidal shaped flexible tube received within said housing with the radial outer periphery thereof adjacent the inner surface of said cylindrical housing wall, valve means extending through said housing wall for introducing super-atmospheric pressure into said tube, means defining a fluid pressure generator positioned axially within said tube and embraced thereby, and means defining an inlet port for introducing fluid to said generator for delivery into contact with the exterior surface of said tube at an increased pressure.

5. In a hydraulic pressure fluid accumulator, means defining a generally cylindrical housing having a surrounding tubular wall portion, piston-like end closure members received in sealed relation to said tubular wall, an endless toroidal shaped flexible tube received within said housing, valve means extending through the wall of said housing for introducing super-atmospheric pressure into said tube, pressure fluid generating means supported between said piston-like end closure members in axially arranged position with respect to said toroidal tube and embraced by said tube, means defining an inlet to said generator for introducing low pressure fluid thereto, and means defining a one-way check valve for discharging pressure fluid into contact with the external surface of said tube, said pressure fluid having a higher value than the super-atmospheric pressure in said tube.

6. In a hydraulic pressure fluid accumulator, walls defining a housing; a flexible endless tube received within said housing, said tube having a continuous external annular surface and a closed internal annular surface; valve means extending into said housing for introducing super-atmospheric pressure into contact with the internal annular surface of said tube; and means for introducing hydraulic fluid into said housing under super-atmospheric pressure into contact with the external annular surface of said tube.

7. The hydraulic pressure fluid accumulator defined in claim 6 in combination with a perforate supporting structure within the housing for limiting expansion of the tube in a radially inward direction, the housing being arranged to limit flexing of the tube in a radially outward direction.

8. In a hydraulic pressure fluid accumulator, walls defining a housing of generally tubular shape; an endless ring shaped tube received within said housing, said tube having a continuous flexible wall adapted to be affected by internal and external pressures; valve means extending into said housing for introducing super-atmospheric pressure into contact with the internal surface of said tube; means for introducing hydraulic fluid pressure into said housing to be effective upon the exterior surface of said tube; and a perforate wall within said housing arranged to limit the radially inward flexing of said tube.

9. The hydraulic pressure fluid accumulator defined in claim 8 in combination with a hydraulic pressure fluid generator arranged approximately axially within said tube and communicating with the means for introducing hydraulic pressure fluid into the housing.

10. In a hydraulic pressure fluid accumulator, means defining a housing having a surrounding wall; a flexible bag in said housing, said bag comprising an endless ring shaped tube having a continuous flexible wall; means for admitting air at atmospheric pressure to the interior of said bag; and means adapted to admit return hydraulic pressure fluid into said housing exterior to said bag to be effective upon the exterior surface of said bag whereby to prevent occlusion of air in said hydraulic pressure liquid.

11. A hydraulic pressure fluid accumulator as defined in claim 10 wherein means are provided which extend axially through the bag for limiting radially inward flexing of the adjacent wall of said bag.

12. In a hydraulic pressure fluid accumulator, housing walls defining a high pressure delivery chamber; pressure generating means in said chamber for delivering pressure liquid thereto; a toroidal flexible body of hollow cross section encompassing said pressure generating means, said body being internally charged with super-atmospheric pressure and being externally affected by pressure liquid from said generating means; and a perforate supporting structure in said chamber between said generating means and said toroidal body and arranged to limit radially inward flexing of said toroidal body, the radially outward flexing of said toroidal body being limited by the wall of said chamber.

13. In a hydraulic pressure fluid accumulator, housing walls defining a high pressure liquid delivery chamber and a low pressure return liquid chamber arranged in side-by-side relationship; perforate annular supporting structures in said chambers; toroidal flexible bodies of hollow cross section in said chambers between the respective supporting structures and the housing walls, the toroidal body in said low pressure chamber being vented to atmospheric pressure and the toroidal body in said high pressure chamber being charged with super-atmospheric pressure; pressure generating means for delivering pressure liquid into said high pressure chamber to be effective upon the flexible toroidal body therein, said pressure generating means being arranged axially within and encompassed by the flexible toroidal body in said high pressure chamber; and means defining an inlet port for introducing low pressure return liquid into said low pressure chamber to be effective upon the flexible toroidal body therein; the radially outward flexing of said toroidal bodies being limited by said housing wall, and the radially inward flexing of said toroidal bodies being limited by the respective perforate supporting structures.

14. In a hydraulic pressure fluid accumulator, means defining a housing having a tubular surrounding wall; a transverse wall dividing the interior of said housing into a first high pressure chamber and a second low pressure fluid return chamber; a perforate cylinder within said high pressure chamber and arranged coaxial to said tubular housing wall; an annulus shaped flexible tube received within said high pressure chamber between said perforate supporting structure and the housing wall, radially inward and outward movement of said annulus tube being limited respectively by said perforate cylinder and said housing wall; valve means extending through said tubular housing wall for introducing super-atmospheric pressure into said annulus tube; means for introducing hydraulic fluid into said high pressure chamber under super-atmospheric pressure to contact with the exterior surface of said annulus tube; a perforate cylinder within said low pressure return chamber arranged coaxial to said tubular housing wall; a second annulus shaped flexible tube received within said low pressure return chamber between said housing wall and the adjacent perforate cylinder, radially inward and outward flexing of said second annulus tube being limited respectively by said last-mentioned perforate cylinder and said housing wall; venting means for constantly maintaining said second annulus tube in communication with surrounding atmospheric pressure; and inlet means for introducing low pressure return fluid into said second low pressure fluid return chamber to be effective upon the annulus shaped flexible tube therein.

15. A hydraulic pressure fluid accumulator arangement as defined in claim 14 which includes means defining a fluid pressure generator arranged axially within and encompassed by said first annulus shaped flexible tube for introducing hydraulic pressure fluid into said first high pressure chamber.

16. In a hydraulic pressure generator and accumulating assembly, the improvements which comprise a hollow body of toroidal shape, said body being entirely closed except for relatively small port means for communicating with the interior thereof to supply air thereinto, said body being so constructed and arranged that it is adapted to embrace portions of said assembly and to react in all directions upon hydraulic pressure on the exterior thereof.

17. In a hydraulic pressure generator and accumulating assembly, as defined in claim 16, wherein the walls of the body are flexible whereby to be readily affected by internal and external pressures.

18. In a hydraulic pressure generator and accumulating assembly, as defined in claim 16, wherein the hollow toroidal body is approximately wholly submerged in the hydraulic pressure fluid.

19. In a hydraulic pressure generator and accumulator assembly, the improvements which comprise a hollow toroidal body wholly submerged in the hydraulic pressure fluid and communicating with the atmosphere, said body being adapted to embrace portions of said assembly and to react in all directions upon ambient pressure.

EDWARD A. ROCKWELL.

REFERENCES CITED

The following references are of record in the file of this patent:

UNITED STATES PATENTS

| Number | Name | Date |
|---|---|---|
| 345,253 | Northey | July 6, 1886 |
| 349,777 | Adlung | Sept. 28, 1886 |
| 1,893,685 | Pirsch | Jan. 10, 1933 |
| 2,163,764 | Rockwell | June 27, 1939 |
| 2,318,128 | Tabb | May 4, 1943 |
| 2,246,667 | Colman | June 24, 1941 |
| 2,256,835 | Mercier | Sept. 23, 1941 |
| 2,273,505 | Florian | Feb. 17, 1942 |
| 2,320,886 | Quiroz | June 1, 1943 |
| 2,337,771 | Roberts | Dec. 28, 1943 |